United States Patent [19]
Dietz et al.

[11] 3,871,853
[45]*Mar. 18, 1975

[54] METHOD OF MELTING GLASS IN A PLATINUM CONTAINER IN A CONTROLLED ATMOSPHERE

[75] Inventors: Earl D. Dietz; Paul R. Wengert, both of Toledo, Ohio

[73] Assignee: Owens-Illinois, Inc., Toledo, Ohio

[ * ] Notice: The portion of the term of this patent subsequent to Sept. 24, 1991, has been disclaimed.

[22] Filed: July 9, 1973

[21] Appl. No.: 377,883

Related U.S. Application Data

[63] Continuation-in-part of Ser. Nos. 177,095, Sept. 1, 1971, abandoned, and Ser. No. 177,090, Sept. 1, 1971, Pat. No. 3,837,828.

[52] U.S. Cl............................ 65/32, 65/30, 65/134, 65/157
[51] Int. Cl.......................... C03b 5/16, C03c 15/00
[58] Field of Search .......... 65/32, 134, 30, 157, 374

[56] References Cited
UNITED STATES PATENTS

| 3,233,993 | 2/1966 | Weidel................................ 65/32 X |
| 3,716,349 | 2/1973 | Deeg et al.......................... 65/134 X |
| 3,837,828 | 9/1974 | Dietz et al. ............................. 65/32 |

OTHER PUBLICATIONS

Abstract, American Ceramic Soc. Bull., Sept. 1970, p. 820, 13-G-70f, Contamination of Glass by Platinum. Journal of Non-crystalline Solids, 6(1971), Volume 6, No. 4, Nov.-Dec. 1971, pp. 294–306.

Primary Examiner—S. Leon Bashore
Assistant Examiner—Frank W. Miga
Attorney, Agent, or Firm—Richard D. Heberling; E. J. Holler

[57] ABSTRACT

This invention provides methods for melting glass laser compositions to provide glass laser rods with a minimum of noble metal inclusions and a minimum of dissolved noble metal content. The process comprises melting the laser glass in a platinum container in a controlled reducing atmosphere using a buffered gas mixture, such as $CO_2/CO$ in which the partial pressure of oxygen is at a minimum level that is equivalent to a range of about $10^{-8.6}$ to $10^{-38}$ atmospheres for a temperature range of about 981°F. to 3,321°F. for a silicate glass. A method also is provided for melting glass to make high-quality glass articles in a noble metal container or a lined container in which the container or the liner therefore has at least 50% by weight of platinum without any attack on the container by the unwanted formation of a noble metal alloy from the glass melt during melting. The method comprises heating molten glass in the platinum container, providing a reducing atmosphere in which the partial pressure of oxygen is no greater than about $10^{-3}$ atmospheres with a buffered gas mixture, and controlling the reducing atmosphere by maintaining the partial pressure of oxygen above the amount at which oxides of an element such as $SiO_2$, $Li_2O$ and $Na_2O$ are reduced to the element such as Si, Li or Na, so that the element does not react with the platinum metal to form a platinum-Si alloy.

13 Claims, No Drawings

METHOD OF MELTING GLASS IN A PLATINUM CONTAINER IN A CONTROLLED ATMOSPHERE

The invention here described was made in the course of a contract with the United States Government.

CROSS-REFERENCES TO RELATED APPLICATIONS

This application is a continuation-in-part application of patent application Ser. No. 177,095, filed Sept. 1, 1971, now abandoned and a continuation-in-part of patent application Ser. No. 177,090, filed Sept. 1, 1971 now U.S. Pat. No. 3,837,828.

THE INVENTION

This invention relates to a method of melting glass to provide high-quality glass articles, including glass laser articles, by heating molten glass in a noble metal container containing at least about 50% by weight of platinum in an atmosphere that is controlled by maintaining the partial pressure of oxygen above the amount at which the oxides of a glass-forming element in the glass are reduced to the element which, in turn, would react with the noble metal to thus attack the container.

The invention also relates to a method of melting glass laser compositions, preferably lithia-calcia-alumina silicate glasses, to provide high-quality glass laser rods by melting the glass in a noble metal container containing at least about 50 percent by weight of platinum in an atmosphere that is reducing and that is controlled by maintaining the partial pressure of oxygen at a minimum level that is equivalent to a range of about $10^{-8.6}$ to $10^{-38}$ atmospheres for a silicate glass. The controlling of the reduced atmosphere reduces the amount of noble metal inclusions in the glass laser rod, reduces the amount of dissolved noble metal in the resultant rod, and eliminates attack of the noble metal container.

It is desirous to melt glass to provide high-quality articles in a platinum container or a container that is at least 50% by weight platinum, in addition to other noble metals, without attack on the container.

It is highly desirable to melt the laser glass compositions to provide very high-quality glass laser rods in a noble metal container having a major proportion of platinum without any undesirable amount of noble metal inclusions, such as platinum inclusions, and a minimum of dissolved platinum content in the rod.

It is an object of the present invention to provide a method of melting glass to provide high-quality glass articles in a noble metal container having at least 50% by weight of platinum without any attack on the container by controlling the atmosphere above the melt and maintaining the partial pressure of oxygen above the melt above a minimum amount, whereby above such minimum amounts the oxides of the glass-forming element of the glass are reduced which element, in turn, would react with the platinum to attack the container.

It is an object of the present invention to provide a method of melting glass laser compositions with a minimum of platinum and noble metal inclusions and a minimum of dissolved platinum content, in which the process comprises melting the laser glass composition in a noble metal container having at least 50% by weight of platinum in a controlled reducing atmosphere using a buffered gas mixture in which the partial pressure of oxygen is at a minimum level that is equivalent to a range of about $10^{-8.6}$ to $10^{-38}$ atmospheres for a silicate glass.

It is an object of the present invention to provide a method of melting glass to provide high-quality glass articles in a platinum container with no attack on the platinum container, the method comprising heating molten glass in a platinum-containing container and controlling the atmosphere above the melt with a buffered gas mixture by maintaining the partial pressure of oxygen above the melt so that the partial pressure of oxygen is no greater than about $10^{-3}$ atmospheres, and so that the metal oxides in the glass are not reduced to the metal element, which metal element would react with platinum to form a metal-platinum alloy that is deleterious to the container.

It is an object of the present invention to provide a method of melting glass to provide high-quality articles, such as a lithium-silicate glass composition, in a platinum container without attack on the platinum container and without deleterious platinum inclusions in the glass.

It is an object of the present invention to melt glass laser compositions, preferably those of a lithium-silicate glass system, with a minimum of platinum inclusions and a minimum of dissolved platinum content in the rod; the process comprising melting the glass in a platinum metal container in a controlled reducing atmosphere in which the partial pressure of oxygen preferably is at a minimum level that is equivalent to a range of about $10^{-8.6}$ to $10^{-38}$ atmospheres for a temperature range of about 981°F. to 3,321°F. for a silicate glass; the partial pressure of oxygen of $10^{-38}$ atmospheres being a minimum at the low temperature of about 980°F. and the partial pressure of $10^{-8.6}$ being a minimum at the high temperature of about 3,320°F., the process producing the aforementioned outstanding laser rod or disc with a minimum of platinum inclusions and a minimum of dissolved platinum content.

It is an object of the present invention to provide a method of melting lithia-calcia-alumino silicate glass compositions to provide a glass rod with a minimum of platinum inclusions and dissolved platinum, the process comprising melting the laser glass composition in a controlled atmosphere, using a buffered gas mixture such as a mixture of $CO_2$ and CO, in which the partial pressure of oxygen is between about $10^{-8}$ and $10^{-12}$ atmospheres at 2,600°F. to produce the high-quality glass rod and at the same time, avoid attack on the platinum container.

These and other objects will be apparent from the specification that follows and the appended claims.

The present invention provides a method of melting glass to provide high-quality glass articles in a noble metal container containing at least 50 percent by weight of platinum, (the balance of the noble metal being iridium, palladium, rhodium, osmium, gold, silver, Re, and preferably platinum) without any attack on the noble metal container by the formation of a noble metal alloy from the glass melt, the method comprising heating molten glass in the container in a reducing atmosphere in which the partial pressure of oxygen is no greater than about $10^{-3}$ atmospheres with a buffered gas mixture, such as $CO_2/CO$. In the above described method, the atmosphere is controlled by maintaining the partial pressure of oxygen above the amount at which the oxides of a glass-forming element in the glass are reduced to the elements, which elements react with a noble metal to form a noble metal element alloy that is deleterious to the container, the free energy of the following chemical reaction being always greater than zero and the partial pressure of oxygen being effective such that the oxide does not reduce according to the following reaction: $MO_x$ (in glass solution) → M (in noble metal solution, failed part) + $x/2$ $O_2$ (gas at $P_{O_2}$) where M is an oxide forming element of a glass batch ingredient used to make high quality glass articles, O is oxygen, X is the fraction or integer describing the oxide stoichiometry, and $P_{O_2}$ is the partial pressure of oxygen, the change in free energy being expressed by the following equation:

$$\Delta F = -\Delta F°_f(MO_x) + RT \log_e\{[(P_{O_2}{}^{x/2}(a_M)]/(a_{MO_x})\}$$

where $\Delta F$ is the change in free energy for the reaction, $\Delta F°_f(MO_x)$ is the standard state Gibbs free energy of formation of the oxide, $MO_x$, at a constant temperature; $a_{MO_x}$ is the thermodynamic activity of the oxide, $MO_x$, in glass solution; $a_M$ is the thermodynamic activity of the element, M, in $Pt$ solution at the point of $Pt$ part failure; R is the gas constant equal to about 1.98717 cal/mole deg.; and T is temperature in degrees Kelvin.

The present invention provides a method of melting glass laser compositions with a minimum of platinum inclusions and a minimum of dissolved platinum content in the resultant glass laser material, the process comprising melting the laser glass composition in a container having at least 50% by weight of platinum in a reducing atmosphere with a buffered gas mixture, the atmosphere having a minimum level of the partial pressure of oxygen that is equivalent to a range of about $10^{-8.6}$ to $10^{-38}$ atmospheres for a temperature range of about 981°F. to 3,321°F. for a silicate glass; the partial pressure of oxygen of $10^{-38}$ atmospheres being a minimum at the low temperature of about 981°F. and the partial pressure of $10^{-8.6}$ being a minimum at the high temperature of about 3,321°F., the minimum level of the partial pressure of oxygen, expressed as $\log_{10} P_{O_2}$ at the temperature used to melt the glass, being set forth below:

| T. °F. | $\log_{10} P_{O_2}$ |
|---|---|
| 981 | −38 |
| 1701 | −22 |
| 1881 | −20 |
| 2061 | −18 |
| 2241 | −16 |
| 2421 | −14 |
| 2601 | −13 |
| 2781 | −12 |
| 2961 | −11 |
| 3141 | −10 |
| 3321 | −8.6 | where the minimum levels of $\log_{10} P_{O_2}$ are determined according to the following equation:

$$\Delta F = \Delta F°_f + RT \ln\{a_{SiO_2}{}^{glass}/[(a_{Si}{}^{Pt})(P_{O_2})]\} = 0$$

in which
$\Delta F$ is the change in free energy; $\Delta F°_f$ is the standard state Gibbs free energy of formation of $SiO_2$ which is −145,600 cal/mole at 2,600°F.;
R is the universal gas constant equal to about 1.98717 cal/mole deg;
T is the temperature at which the glass is melted in degrees Kelvin which is 1,700° at 2,600°F.;
$a_{SiO_2}{}^{glass}$ is 0.15; $a_{Si}{}^{Pt}$ is $10^{-5}$; and $P_{O_2}$ is the partial pressure of oxygen.

It is highly desirable to melt glass and form high-quality glass articles in a platinum container with no attack of the container. In accordance with the present invention, this is accomplished by controlling the partial pressure of oxygen above a minimum amount so that metal oxides in the glass are not reduced to the metal which, in turn, would react with platinum to form a metal platinum alloy, the melting of the glass being accomplished in a reducing atmosphere in which the partial pressure of oxygen is no greater than about $10^{-3}$ with a buffered gas mixture such as $CO_2/NH_3$, $CO_2/H_2$, $H_2O/H_2$, $H_2O/NH_3$, $H_2O/CO$ and $CO_2/CO$.

It is preferred that the glasses (including laser glasses) of the present invention be lithium silicate glasses, although other silicate glasses are useful in making high-quality articles according to the present invention. Generally M is silicon in the preceding equation describing the change in free energy.

It is preferred that the glass composition be a lithium oxide-calcium oxide-aluminum oxide silicate composition containing at least about 8 mole percent lithia. In this case, excellent high-quality articles, particularly glass laser articles, are made by melting the composition and controlling the partial pressure of oxygen so that it is no greater than about $10^{-3}$ atmospheres to thereby eliminate attack of the platinum container, and the partial pressure of oxygen is also greater than about $10^{-13}$ atmospheres at 2,600°F. to keep the platinum inclusions and the dissolved platinum content in the glass to a minimum. It is preferred that the above glass (and particularly the laser glass) have the following ingredients in approximate mole percent:

| INGREDIENTS | PERCENT |
|---|---|
| $SiO_2$ | 45 to 75 |
| $Li_2O$ | 15 to 35 |
| CaO | ½ to 30 |
| $Nd_2O_3$ | 1/10 to 2 |
| $Al_2O_3$ | 0 to 8 |

Suitable glass compositions that can be formed into high-quality articles and preferably laser glass articles without attack on the platinum or noble metal container and with a minimum of platinum inclusions in accordance with the present invention by controlling the partial pressure of oxygen are $K_2O$—$Na_2O$—BaO—$SiO_2$ glasses, $Na_2O$—BaO—$SiO_2$ glasses, and other alkali oxide-alkaline earth oxide silicate glasses with or without additions of $Al_2O_3$ and $Sb_2O_3$. Specific glass compositions are shown below with their approximate mole fractions.

TABLE 1

GLASS COMPOSITIONS

| Glass No. | Component | Mole Fraction |
|---|---|---|
| 1 | $SiO_2$ | 0.785 |
|  | BaO | 0.014 |
|  | $Na_2O$ | 0.080 |
|  | $K_2O$ | 0.112 |
|  | $Nd_2O_3$ | 0.010 |
| 2 | $SiO_2$ | 0.785 |
|  | $Al_2O_3$ | 0.014 |
|  | $Sb_2O_3$ | 0.002 |

TABLE 1—Continued

GLASS COMPOSITIONS

| Glass No. | Component | Mole Fraction |
|---|---|---|
|  | BaO | 0.014 |
|  | ZnO | 0.017 |
|  | $Li_2O$ | 0.023 |
|  | $Na_2O$ | 0.068 |
|  | $K_2O$ | 0.113 |
|  | $Nd_2O_3$ | 0.010 |
| 3 | $SiO_2$ | 0.791 |
|  | $TiO_2$ | 0.004 |
|  | $Sb_2O_3$ | 0.005 |
|  | BaO | 0.018 |
|  | PbO | 0.006 |
|  | $Na_2O$ | 0.045 |
|  | $K_2O$ | 0.126 |
|  | $Nd_2O_3$ | 0.006 |
| 4 | $SiO_2$ | 0.480 |
|  | $B_2O_3$ | 0.174 |
|  | $Al_2O_3$ | 0.073 |
|  | $As_2O_3$ | 0.073 |
|  | BaO | 0.255 |
|  | $Nd_2O_3$ | 0.013 |
| 5 | $SiO_2$ | 0.593 |
|  | $Al_2O_3$ | 0.025 |
|  | $K_2O$ | $2.12 \times 10^{-7}$ |
|  | $CeO_2$ | $1.6 \times 10^{-3}$ |
|  | $Fe_2O_3$ | $9.4 \times 10^{-8}$ |
|  | $Na_2O$ | $9.42 \times 10^{-7}$ |
|  | $Li_2O$ | 0.275 |
|  | $Nd_2O_3$ | 0.005 |
|  | CaO | 0.100 |
| 6 | $SiO_2$ | 0.762 |
|  | $Al_2O_3$ | 0.017 |
|  | $Sb_2O_3$ | 0.002 |
|  | BaO | 0.023 |
|  | ZnO | 0.017 |
|  | $Li_2O$ | 0.023 |
|  | $Na_2O$ | 0.077 |
|  | $K_2O$ | 0.080 |
|  | $Nd_2O_3$ | 0.010 |
| 7 | $SiO_2$ | 0.792 |
|  | $Al_2O_3$ | 0.010 |
|  | BaO | 0.022 |
|  | ZnO | 0.012 |
|  | $Li_2O$ | 0.022 |
|  | $Na_2O$ | 0.080 |
|  | $K_2O$ | 0.053 |
|  | $Nd_2O_3$ | 0.007 |
| 8 | $SiO_2$ | 0.773 |
|  | $Sb_2O_3$ | 0.002 |
|  | BaO | 0.113 |
|  | $Na_2O$ | 0.100 |
|  | $K_2O$ | 0.013 |

Also suitable is the following glass composition given in approximate parts by weight:

| | | |
|---|---|---|
| | $SiO_2$ | 67.17 |
| | CaO | 10.80 |
| | $Na_2O$ | 15.93 |
| | $K_2O$ | .19 |
| | $Al_2O_3$ | .75 |
| $Sb_2O_3$ + | $As_2O_3$ | .38 |
| | $Nd_2O_3$ | 4.78 |
| | | 100.00 |

The term noble metal "failure" or platinum "failure" occurs in the case of platinum (1) if a liquid phase were to be formed (2) if an intermetallic alloy compound is formed or (3) there is a large increase in the platinum lattice parameter ($d$ spacing) that occurs on the addition of a contaminating metal element. Hence, the point of failure of platinum parts in contact with the glass during the melting operation can be calculated using thermodynamic data such as free energy data, the activities of oxides in the glass, and the activities of the corresponding metals in platinum. The lowest oxygen partial pressure one can use for controlling the melting of the lithium oxide-calcium oxide-aluminum oxide silicate glass composition is generally about $10^{-13}$ at 2,600°F. It is desired, of course, to reduce the partial pressure of oxygen as low as possible in order to minimize the partial pressure of any $PtO_2$ (gas) above the melt and the activity of the corresponding platinum oxide complex of the glass. Hence, in accordance with the equations previously set forth, platinum failure can be expected to occur somewhere below $10^{-7}$ atmospheres at 2,600°F., and usually not until $10^{-13}$ atmospheres at 2,600°F. (1,700°K.). Generally, in the above-described lithium oxide-calcium oxide-aluminum oxide silicate glass, platinum metal failure does not occur until a lower $P_{O_2}$ is reached within the glass and hence the critical element is the $SiO_2$ reduction reaction to Si. The following table gives partial pressure of oxygen below which there will generally be platinum failure caused by the formation of the platinum-metal element alloy.

| ELEMENT | $P_{O_2}$ at 2,600°F. |
|---|---|
| Si | Generally below about $10^{-11}$ to as low as $10^{-13}$ atm. |
| Li | $10^{-14}$ atm. |
| Ca | $10^{-21}$ atm. |

It can be seen that in the case of the lithium oxide-calcium oxide aluminum oxide silicate, the silica reduction is controlling the lower limit of the $P_{O_2}$. If silica were not present, other oxide constituents would control the lower limit of $P_{O_2}$.

In accordance with the present invention, the thermodynamic calculations for the partial pressure of oxygen provided for platinum metal failure in contact with an $LiO$—$CaO$—$SiO_2$—$Nd_2O_3$ glass can be written. It can be seen that platinum failure can be expressed from a chemical point of view by reaction 1. Silicon is used as an example.

$$Si (X_{Si}^{Pt} \text{ in failed Pt}) + O_2 (\text{gas}, P_{O_2}) \rightarrow SiO_2 (X_{SiO_2}^{glass} \text{ in glass solution}); T = 1,700°K. \text{ Reaction} = R_x \quad (1)$$

When these three phases are in equilibrium at the appropriate mole fractions and partial pressure, the Pt will have "failed" by definition. Equilibrium occurs when the Gibb's free energy for Reaction (1) ($\Delta F_{\textcircled{1}}$) is zero.

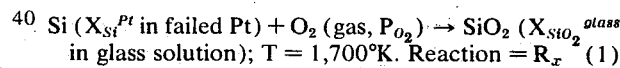

$$\Delta F = \Delta F° + RT \ln \{ a_{SiO_2}^{glass} / [(a_{Si}^{Pt})(P_{O_2})] \} = 0$$

Eq. II-1

The $P_{O_2}$ required for $\Delta F \leq 0$ is desired. $\Delta F°_{\textcircled{1}} = \Delta F°_f$ ($SiO_2$) = $-137,931$ cal/mole at 1,700°K. (2,600°F.).

For glass composition No. 5, $X_{SiO_2}^{glass} = 0.593$ and the $a_{SiO_2}^{glass}$ has been experimentally determined; because failure was not observed above $P_{O_2} = 10^{-10}$ atm., let $a_{SiO_2}^{glass} = 0.15$ for the calculation. The mole fractions of the glass constituents are not being changed in order to avoid Pt failure, so these mole fractions and corresponding activities will remain constant for the calculations.

The $a_{MeO_x}^{glass's}$ are available at 1,700°K. for $SiO_2$, $Li_2O$ and CaO. Insufficient data is available to estimate $a_{Al_2O_3}^{glass}$.

There are two ways of estimating the $a_{Si}^{Pt}$ at failure, the last parameter necessary in order to calculate $P_{O_2}$ required for failure. The $a_{Si}^{Pt}$ can be estimated knowing the $\Delta F°_f$ ($SiPt_3$), $a_{Si}^{Pd}$, $a_{Si}^{Re}$, or $a_{Si}^{Ni}$. Based upon this empirical data, the $a_{Si}^{Pt}$ at failure has been estimated to be $10^{-5}$ at 1,533°K. These data could be temperature corrected from 1,533°K. to 1,700°K. by assuming that Tlog $a_{Me}^{Rt}$ is not a function of temperature. This can be demonstrated by considering the reaction:

$$\text{Me (pure)} \rightarrow \text{Me (in Pt. sol'n)} \quad \text{Rx (2)}$$

For Rx (2), $\Delta F_{②} = \Delta H_{②} - T\Delta S_{②}$. $\Delta S_{②} \approx 0$ because the degree of disorder is similar between solids and between solids and liquids; therefore, $\Delta F_{②}$ is not a strong F (T). Also note:

$$\Delta F_2 = + RT \ln a_{Al_2O_3} \text{ glass.}$$

Therefore, T log $a_{Al_2O_3}^{glass}$ is not a strong $f(t)$. Using this relation, the $a_{Me}^{Pt}$ at 1,700°K. can be calculated knowing $a_{Al}^{Pt}$ at 1,533°K. Consider $a_{Si}^{Pt}$ as an example:

(1,533°K.) log $[a_{Si}^{Pt}$ @ 1,533°K.$]$ + (1,700°K.) log $[a_{Si}^{Pt}$ @ 1,700°K.$]$ log $[a_{Si}^{Pt}$ @ 1,700°K.$]$ = (1533/1700) $(10^{-5}) = 0.9 \times 10^{-5} \approx 10^{-5}$ Since the estimated value of the $a_{Me}^{Pt}$ at 1,533°K. is not accurate to more than one order of magnitude, the $a_{Me}^{Pt}$ at 1,533°K. $a_{Me}^{Pt}$ at 1,700°K.

Using the above values and in the previous equation, the $P_{O_2}$ required for failure is calculated:

$-145,600 + (1.987)(2.303)(1,700°K.) \log_{10} \{0.15/(10^{-5})(P_{O_2})\} = 0$

Therefore, $P_{O_2} \leq 10^{-13.0}$ atm. is order for failure to occur.

The same calculation is done for the other oxides and metals. The data used is presented in Table 2.

The other method of estimating the $a_{Me}^{Pt}$ at failure assumes that ~1 at.% of the metal (Me) can be dissolved in the Pt before failure would be expected. The $a_{Me}^{Pt}$ is related to the mole fraction ($X_{Me}^{Pt}$) by the relation $a_{Me}^{Pt} = \gamma_{Me}^{Pt} X_{Me}^{Pt}$ where $\gamma_{Me}^{Pt}$ is the activity coefficient as empirically determined. Table 3 lists the data used in the previous equation to calculate $P_{O_2}$ required for failure and the obtained $P_{O_2}$ values.

TABLE 2

CALCULATION OF $P_{O_2}$ REQUIRED FOR Pt FAILURE ASSUMING
T = 1,700°K. = 2,600°F.

| Element (Me) | glass $a_{MeO_x/2}$ | $a_{Me}^{Pt}$ | $\Delta F° f(MeO_x)$ (cal/mole) | $P_{O_2}$ Required for Pt Failure |
|---|---|---|---|---|
| Si | 0.15 | $10^{-5}$ | −145,600 | $\leq 10^{-13.0}$ atm. |
| Li | $6 \times 10^{-10}$ | $10^{-6}$ | −85,431 | $\leq 10^{-13.8}$ atm. |
| Al | $1.29 \times 10^{-2}$ | $10^{-8}$ | −269,989 | $\leq 10^{-12.6}$ atm. |
| Ca | 0.1 | $10^{-4}$ | −108,160 | $\leq 10^{-20.0}$ atm. |

TABLE 3

CALCULATION OF $P_{O_2}$ REQUIRED FOR Pt FAILURE ASSUMING
$X_{Me}^{Pt} = 0.01$ and $\gamma_{Me}^{Pt}(X_{Me}^{Pt} = 0.01 = \gamma_{Me}^{Pt}$
T = 1,700°K. = 2,600°F.

| Element (Me) | $a_{MeO_x}$ | $X_{Me}^{Pt}$ | $X_{Me}^{Pt}$ | $\Delta F°_f(MeO_x)$ cal/mole | $P_{O_2}$ required for Pt failure |
|---|---|---|---|---|---|
| Si | 0.15 | 0.01 | $9 \times 10^{-7}$ | −145,600 | $\leq 10^{-11.5}$ atm. |
| Li | $6 \times 10^{-10}$ | 0.01 | $5 \times 10^{-5}$ | −85,431 | $\leq 10^{-11.8}$ atm. |
| Ca | 0.1 | 0.01 | $1 \times 10^{-6}$ | −108,160 | $\leq 10^{-21.2}$ atm. |

It can be seen that outstanding high-quality glass articles can be formed from glass melts by melting the glass in a noble metal container, having at least about 50 and preferably about 90% by weight of platinum, and controlling the atmosphere with a buffered glass mixture that is a reducing mixture and controlling the partial pressure of oxygen therein so that the glass-forming oxides do not reduce and form the glass-forming element which, in turn, can attack the platinum or other noble metal in the container. The controlling of the partial pressure of oxygen is such that it is not greater than about $10^{-3}$ atmospheres and for a lithia-calcia-alumino silicate glass is at a value equivalent to that of about $10^{-13}$ atmospheres at 2,600°F. The following table provides the method of selecting other partial pressures of oxygen at other melting temperatures other than 2,600°F. This table sets forth the minimum $\log_{10} P_{O_2}$ values for a silicate glass (preferably the $Li_2O$—$CaO$—$Al_2O_3$—$SiO_2$ glasses) at various temperatures from about 261°F. to 3,321°F. that can be used without platinum or noble metal failure:

TABLE 4

| T °F. | T °C. | T °K. | $\log_{10} P_{O_2}$ |
|---|---|---|---|
| 261 | 127 | 400 | −85 |
| 441 | 227 | 500 | −68 |
| 801 | 427 | 700 | −44 |
| 981 | 527 | 800 | −38 |
| 1701 | 927 | 1200 | −22 |
| 1881 | 1027 | 1300 | −20 |
| 2061 | 1127 | 1400 | −18 |
| 2241 | 1227 | 1500 | −16 |
| 2421 | 1327 | 1600 | −14 |
| 2601 | 1427 | 1700 | −13 |
| 2781 | 1527 | 1800 | −12 |
| 2961 | 1627 | 1900 | −11 |
| 3141 | 1727 | 2000 | −10 |
| 3321 | 1827 | 2100 | −8.6 |

Hence, at about 2,600°F., the partial pressure of oxygen should be kept above about $10^{-13}$ atmospheres. At about 2,421°F., the controlling of the partial pressure of oxygen should be at a level above about $10^{-14}$ to prevent platinum failure. Hence, the critical value of $P_{O_2}$ of about $10^{-14}$ atmospheres at about 2,421°F. is equivalent to about $10^{-13}$ atmospheres at about 2,601° or 2,600°F.

In the present invention, a reducing atmosphere is defined as any atmosphere maintaining a $P_{O_2} \leq 10^{-3}$ atm.

When a silicate glass is melted generally a range of $P_{O_2}$ of about $10^{-8}$ to $10^{-13}$ atm. is preferred to provide a practical melting process. For some commercial applications, it is highly preferred that the $P_{O_2}$ be controlled at about $10^{-11}$ to $10^{-13}$ atm., generally the closer to the minimum about $10^{-13}$ atm., the greater the advantage.

In the present invention that provides outstanding glass laser articles such as rods and discs, the controlled reducing atmosphere generally should be one that is equivalent to about $10^{-2}$ to about $10^{-50}$ atmospheres at 2,600°F., although it is preferred that the partial pressure of oxygen be about $10^{-4}$ to $10^{-15}$ atmospheres. For best results in a practical process, the partial pressure is about $10^{-8}$ to $10^{-12}$ atmospheres at 2,600°F. to greatly reduce the amount of platinum inclusions in the resultant glass laser rod and avoid attack on the platinum container.

In one outstanding embodiment, partial pressure of the oxygen is about $10^{-10}$ atmospheres at 2,600°F. when using a lithiacalcia-alumina silicate glass laser composition comprising the following ingredients in approximate mole percentages:

| INGREDIENTS | PERCENT |
|---|---|
| $SiO_2$ | 45 to 75 |
| $Li_2O$ | 15 to 35 |
| CaO | ½ to 30 |
| $Nd_2O_3$ | 1/10 to 2 |
| $Al_2O_3$ | 0 to 8 | where the total amount of $Li_2O$ and CaO is not substantially higher than about 50 mole percent; when the $Li_2O$ is present at about 15 mole percent, the amount of CaO is at least about 10 mole percent; and when the CaO content is at about ½ mole percent, the amount of $Li_2O$ is at least about 24 mole percent.

Outstanding glass laser rods can be made using a glass laser composition comprising the following approximate composition in percent by weight:

| COMPONENT | WEIGHT PERCENT |
|---|---|
| $SiO_2$ | At least 45 up to 80 |
| $Al_2O_3$ | Greater than 4 up to 40 |
| $Li_2O$ | Greater than 5.5 up to 20 |
| $Nd_2O_3$ | At least about 1 up to 8 |

Particularly outstanding glass laser rods have been made from glass laser compositions comprising the following approximate weight percent:

| COMPONENT | WEIGHT PERCENT |
|---|---|
| $SiO_2$ | 77.16 |
| $Al_2O_3$ | 4.68 |
| $Li_2O$ | 15.07 |
| $Nd_2O_3$ | 3.09 |

As indicated above, glass laser compositions of U.S. Pat. Nos. 3,457,182 and 3,471,409 to Lee and Rapp provide outstanding laser rods, and the disclosures of these patents are hereby incorporated by reference.

Excellent results, for instance, have been obtained using the following neodymium oxide doped glass having the following approximate composition:

| INGREDIENTS | MOLE PERCENT |
|---|---|
| $SiO_2$ | 60 |
| $Al_2O_3$ | 2.5 |
| $Li_2O$ | 27.5 |
| CaO | 10 |
| $Nd_2O_3$ | 0.5 |
| $CeO_2$ | 0.16 |

Other alkali metal oxide-alkaline earth oxide-lithia silicate glasses with or without relatively small amounts of $Al_2O_3$ are also suitable, and these are disclosed in United States Patent applications Ser. Nos. 831,257, filed June 6, 1969; and 831,256, filed June 6, 1969, which applications are incorporated by reference herein. Such suitable glass laser compositions comprise the following ingredients in mole percentages:

| INGREDIENTS | MOLE PERCENT |
|---|---|
| $SiO_2$ | 45 to 75 |
| $Li_2O$ | 15 to 35 |
| RO | ½ to 30 |
| $Nd_2O_3$ | 1/10 to 2 |
| $Al_2O_3$ | 0 to 8 | wherein RO is selected from the alkaline earth oxide group consisting of MgO, BeO, SrO, BaO, mixtures thereof, and mixtures of one or more of the foregoing with CaO, where the total amount of $Li_2O$ and RO is not substantially higher than about 50 mole percent; when the $Li_2O$ is present at about 15 mole percent, the amount of RO is at least about 10 mole percent; and when the RO content is at least about ½ mole percent, the amount of $Li_2O$ is at least about 24 mole percent, and when mixtures of CaO and another alkaline earth oxide are employed, said other alkaline earth oxide being present in an amount of at least about 0.1 mole percent.

Other suitable glass laser compositions comprise the following ingredients in mole percentages:

| INGREDIENTS | MOLE PERCENT |
|---|---|
| $SiO_2$ | 45 to 75 |
| $Li_2O$ | 18 to 35 |
| $R_2O$ | 0.5 to 10 |
| $Nd_2O_3$ | 0.1 to 2 |
| $Al_2O_3$ | 0 to 10 | wherein $R_2O$ is a member selected from the group consisting of $Na_2O$; $K_2O$, $Rb_2O$, $Cs_2O$ and mixtures thereof.

By melting glass laser rods in a platinum container under reducing conditions, excellent glass laser rods have been obtained by controlling the partial pressure of oxygen, such controlling of the partial pressure of oxygen being used successfully to reduce platinum inclusions, reduce the amount of dissolved platinum and also avoid attack of the platinum container.

The present invention can be used in the apparatus and methods described in Chapman and LeSueur copending United States patent application Ser. No. 877,076, filed 11/17/69. The buffered gas mixture is used to produce the atmosphere over the glass melt and is used as the inert gas that does not attack or oxidize the platinum-lined container such as the furnace. This application is also incorporated by reference.

Laser rods can be produced by a double melting step in which the partial pressure of oxygen is controlled, say, between about $10^{-8}$ to $10^{-12}$ atmospheres in the first step. The second step is conducted by controlling the $P_{O_2}$ at about $10^{-4}$ or $10^{-6}$ atmospheres. Apparently the first step is effective in hindering the dissolution of Pt into the glass, and the second step is effective in dissolving any platinum inclusions to reproducibly obtain high-quality glass laser articles.

The reducing conditions preferably are provided by a buffered gas mixture that comprises a $CO_2/CO$ mixture that contains generally about 5 up to 6 to around 9 or 10 percent of CO based on the volume of the mixture. Other suitable buffered gas mixtures are $CO_2/NH_3$, $CO_2/H_2$, $H_2O/H_2$, $H_2O/NH_3$ and $H_2O/CO$ generally containing about 2 up to 5 to as high as 10% and preferably about 6 to 8% of the reducing gas, such as CO, $H_2O$ or $NH_3$.

Various modifications of the invention may be made under the patent statutes without departing from the spirit of the invention.

We claim:

1. In a method of melting glass compositions in a container containing at least 50% by weight of platinum with a minimum of attack on the container, the improvement comprising melting the glass in a reducing atmosphere in which the partial pressure of oxygen is no greater than about $10^{-3}$ atmospheres with a buffered gas mixture of the group consisting of $CO_2/NH_3$, $CO_2/H_2$, $H_2O/H_2$, $H_2O/NH_3$, $H_2O/CO$ and $CO_2/CO$.

2. A method of melting glass to provide high-quality glass articles in a platinum container without any attack on the container by the formation of a platinum alloy from the glass melt, the method comprising:
    a. heating molten glass in the container in a reducing atmosphere in which the partial pressure of oxygen is no greater than about $10^{-3}$ atmospheres; and
    b. controlling the reducing atmosphere with a buffered gas mixture that maintains the partial pressure of oxygen above the amount at which the oxides of a glass-forming element in the glass are reduced to the elements, which elements react with a noble metal to form a noble metal element alloy that is deleterious to the container.

3. A method as described in claim 2 in which the buffered gas mixture is $CO_2/CO$.

4. A method as defined in claim 2 in which the buffered gas mixture is $CO_2/NH_3$.

5. A method as defined in claim 2 in which the buffered gas mixture is $CO_2/H_2$.

6. A method as defined in claim 2 in which the buffered gas mixture is $H_2O/H_2$.

7. A method of melting glass to provide high-quality glass articles with no platinum-alloy attack, the method comprising heating molten glass in a platinum-containing container in a reducing atmosphere with a buffered gas mixture of the group consisting of $CO_2/CO$, $CO_2/NH_3$, $CO_2/H_2$, $H_2O/H_2$, $H_2O/NH_3$ and $H_2O/CO$, the buffered gas mixture controlling the partial pressure of oxygen to a level not greater than about $10^{-3}$ atmospheres by adjusting and maintaining the partial pressure of oxygen above the amount at which the metal oxides in the glass are reduced to the metal, which metal reacts with platinum to form a metal-platinum alloy that is deleterious to the container.

8. A method as defined in claim 7 in which the glass is a silicate glass and the buffered gas mixture is $CO_2/CO$.

9. A method as defined in claim 7 in which the glass is a lithium silicate glass composition containing at least about 8 mole percent lithia.

10. A method as defined in claim 7 in which the glass composition is a lithium oxide-calcium oxide-aluminum oxide silicate glass containing at least about 8 mole percent lithia, and the partial pressure of oxygen is controlled so that it is not greater than $10^{-3}$ atmospheres at 2,600°F.

11. A method as defined in claim 7 in which the glass is a silicate glass and the reducing gas is CO, $H_2O$ or $NH_3$.

12. A method as defined in claim 7 in which the glass composition is a lithium oxide-calcium oxide-aluminum oxide silicate glass containing at least about 8 mole percent lithia, and the buffered gas mixture is $CO_2/CO$ containing about 6 to 8 percent by volume CO.

13. A method as defined in claim 7 in which the buffered gas mixture is $CO_2/NH_3$.

* * * * *